Jan. 5, 1937. F. WINKLER 2,066,504

COASTER BRAKE

Filed March 18, 1936

Inventor
FRANZ WINKLER
By
Attorneys

Patented Jan. 5, 1937

2,066,504

UNITED STATES PATENT OFFICE 2,066,504

COASTER BRAKE

Franz Winkler, Wurzburg, Germany

Application March 18, 1936, Serial No. 69,439
In Germany March 22, 1935

5 Claims. (Cl. 192—6)

The invention relates to coaster brakes in freewheel hubs for bicycles, and more especially a coupling therefor and means for positively disengaging same to obtain a frictionless drive of the vehicle.

The object of the invention is to obviate several inconveniences hitherto observed in coaster brakes which inconveniences reside in undue continuous friction consuming a considerable part of the driving force, or in troublesome rattling noise during drive. Besides, care must be taken to provide for an instantaneous engagement of the coupling to avoid lost motion in the application of the brake.

To this end pressure-transmitting means are displaceably provided in one of the coupling members which means are subject to the positive operation of driving elements so that disconnection of the coupling will be ensured with the beginning of the drive, no reaction on the pedals taking place. The automatic engagement of the coupling is attained by means of a heavy spring the power of which can easily be overcome by the positively moved disconnecting means.

In the accompanying drawing, which forms a part of this specification, two embodiments of the invention are represented by way of example.

In said drawing—

Like numerals denote like or similar parts throughout all figures of the drawing.

Figure 1:
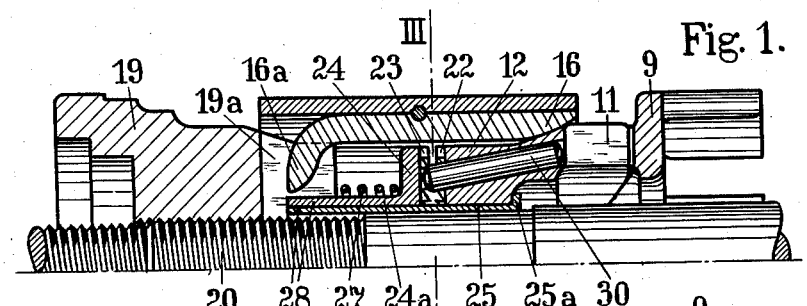
Fig. 1 is a longitudinal partial sectional view of the operating parts housed in the hub shell of a free-wheel hub with coaster brake.
Figure 2:
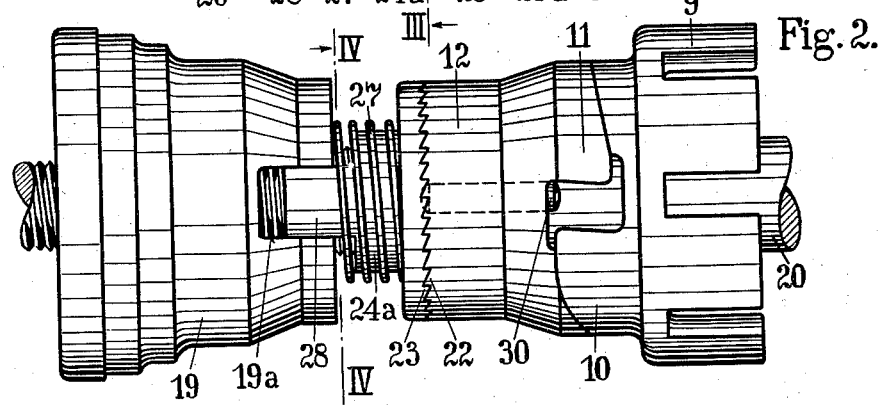
Fig. 2 represents a side view of the unit shown in Fig. 1.
Figure 3:
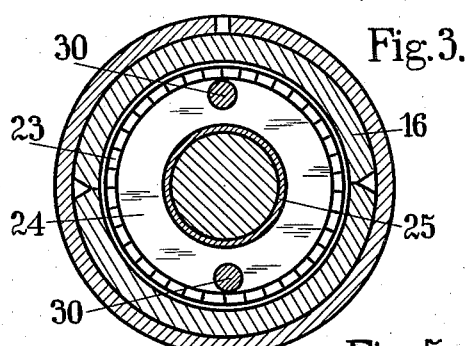
Fig. 3 is a cross section on the line III—III of Fig. 1.
Figure 4:
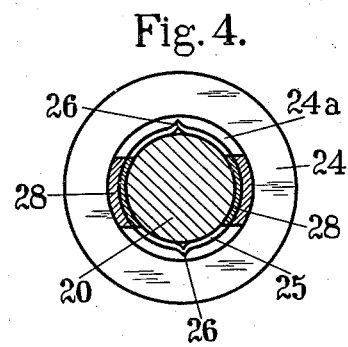
Fig. 4 is a cross section on the line IV—IV of Fig. 2.
Figure 5:
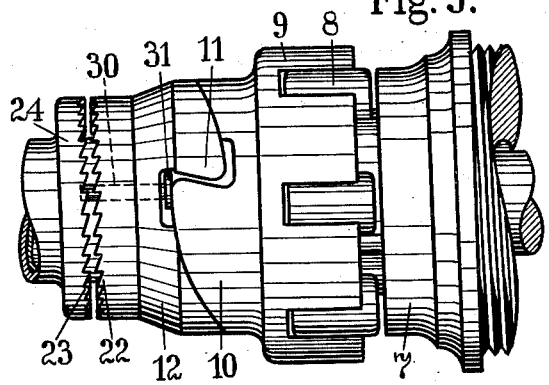
Fig. 5 illustrates a constructional modification of the device.

Referring to Figs. 1 to 4 by which an embodiment of the coaster brake according to the invention is shown in detail, the unit comprises an axle 20, a driving member 7 with a roller clutch 8, such as illustrated in Fig. 5, a stationary brake-expanding cone member 19 fixed oppositely thereto on the axle, a lengthwise slit brake sleeve 16 non-revolubly attached to said cone, a movable cone member 12 displaceable and rotatable on the axle and inversely arranged in the opposite end of the brake sleeve, means for forcing the displaceable cone 12 towards the stationary cone 19, and a coupling 22, 23 adapted to hold the movable cone 12 against rotation on the axle, all being housed in the bicycle wheel hub of usual construction (not shown). The brake sleeve 16 will be expanded for braking the wheel hub when the two cones 12 and 19 are forced into the sleeve 16 from its ends, said sleeve being non-rotatably held by a dog 16a projecting therefrom into diametral slot 19a of the stationary cone 19. As the means for axially shifting the cone member 12 there are provided interengaged teeth 10 and 11 having helical flanks ending into axial flanks. Said teeth project axially respectively from a cage or guide ring 9 and the adjacent face of the shiftable cone 12. The rollers of the clutch 8 are disposed in cam depressions in the circumference of the driver 7 and are retained therein by the cage ring 9. These cam depressions have bases eccentric with respect to the axis of the hub, so that each of said depressions will have a varying depth. A roller clutch of this type is shown in the Sachs Patent No. 960,710, issued June 7, 1910.

To obtain an effective expansion of the brake sleeve 16, it is essential to keep the cone 12 against rotation when it is forcibly moved into the sleeve 16. To this end a coupling member 24 is combined with said cone member 12 which coupling will readily be engaged when the application of the brake begins, but is positively maintained disconnected on driving and free-wheeling through pins 30 guided in longitudinal holes of the cone member 12 itself, the operation of said pins being controlled by the driving means by the aid of the teeth 10. One end of each pin bears against a counter-disc member 24 while the other end of the pin projects into the space between consecutive teeth 11.

The coupling disc 24 is by a sleeve-like extension 24a supported on a sleeve 25 shiftable on the axle 20. These two sleeves are rigidly interconnected through longitudinal grooves and ribs 26. Moreover the extension 24a and the sleeve 25 are at diametrically opposite points cut out so that flat keys 28 are formed which fit into a diametrical cross slot 19a of the cone 19 and are longitudinally movable therein. On the cylindrical extension 24a there is further placed a helical spring 27 bearing against the cone 19 and tending to move the disc 24 and sleeve 25 to the right in Fig. 1. A flange 25a provided upon the other end of the sleeve 25 serves to be a stop or abutment with respect to the cone member 12. Toothed rims 22 and 23 provided respectively on the member 12 and the disc 24 are thus kept at a small distance through the intermediate controlling pins 30.

In the modification illustrated by Fig. 5 the projecting ends 31 of the pins 30 are flat-headed to permit a quick and broader engagement and contact with the teeth 10.

The free-wheel hub with coaster brake and brake-controlling appliance operates as follows.

On forward driving of the bicycle, the driver 7 which is coupled to wheel hub by the aid of the roller clutch 8 rotates the guide ring 9 and teeth 10 which on their part carry round the teeth 11 and the member 12, as the axial faces of said teeth bear against each other, as shown in Fig. 5. In this position the end faces of the teeth 10 are placed on the ends of the pins 30, shifting same into the holes and keeping disconnected the toothed coupling rims 22 and 23 so that the cone member 12 can freely rotate in the brake sleeve 16 and upon the bearing sleeve 25. Stopping the pedals for free-wheeling has only the effect to turn the friction rollers 8 back from the rotating wheel hub, the other parts remaining in their prior position. During driving operations, the rollers of the clutch 8 will be jammed between the hub shell and the shallower portions of the cam depressions in which said rollers are retained so that a driving connection is effected between the driver 7 and said hub shell. On back pedalling, the rollers of the roller clutch 8 are shifted to the deeper portions of the cam depressions so that the drive connection between the driver 7 and the hub shell is broken. Then the cage ring 9 and the teeth 10 are rotated backwards into the position shown in Fig. 2, whereby their helical faces slide on the corresponding faces of the teeth 11. The pins 30 are at once freed from pressure. This will enable the spring 27 to interengage the toothed rims 23 and 22 which will fix the member 12 against rotation, which member is now displaced by the helical teeth 10 and 11 towards the stationary cone 19 and will by cooperation with same expand the brake sleeve 16. Resuming driving causes angular movement of the teeth 10 with the result that the pins 30 are pushed back and the toothed rims 22 and 23 disconnected.

I claim:

1. In a coaster brake for free-wheel hubs in bicycles, the combination with an axle, of a stationary brake-expanding cone, an expansible brake sleeve attached with its one end to said cone, a movable brake-expanding cone displaceable in the other end of the brake sleeve, clutch means adapted to keep, when engaged, the movable cone against rotation, clutch-controlling pins displaceable in longitudinal holes of the movable cone, and means shifting the pins to and fro.

2. In a coaster brake for free-wheel hubs in bicycles, the combination with a wheel axle, of a stationary brake-expanding cone mounted on the axle, an inversely arranged brake-expanding cone displaceable and rotatable on the axle, an expansible brake sleeve mounted on the said cones and non-revolubly attached to the stationary cone, clutch means non-rotatably guided on the axle and adapted to engage clutch means of the displaceable cone, a spring tending to interengage said clutch means, clutch-controlling pins displaceable in longitudinal holes of the movable cone and capable of disconnecting said clutch means against the action of said spring, and driving means acting upon and releasing the controlling pins according to the different operations of the unit.

3. In a coaster brake for free-wheel hubs in bicycles, the combination with an expansible brake sleeve, of a brake-expanding cone-member axially displaceable therein, non-rotatably guided resilient clutch means, corresponding clutch means of the cone, and clutch-controlling means displaceable in longitudinal holes of said cone and adapted to disengage said clutch means.

4. In a coaster brake for free-wheel hubs in bicycles, the combination with an expansible brake sleeve, of a stationary and a movable brake-expanding cone, non-rotatably guided resilient clutch means, corresponding clutch means of the movable cone, clutch-controlling pins displaceable in longitudinal holes of said movable cone and adapted to disengage said clutch means, locking means axially displaceably engaged in a recess of the stationary cone, and a spring tending to interengage said coupling means.

5. In a coaster brake for free-wheel hubs in bicycles, the combination with an expansible brake sleeve, of a stationary and a movable brake-expanding cone, non-rotatably guided resilient clutch means, corresponding clutch means of the movable cone, clutch-controlling pins displaceable in longitudinal holes of said movable cone and adapted to disengage said clutch means, axial helical projections in the interstice of which the ends of the said pins enter, and similar helical members projecting from driving means between and in engagement with said projections and adapted to urge back or release the ends of said pins on their relative angular movement.

FRANZ WINKLER.